United States Patent Office 3,496,186
Patented Feb. 17, 1970

3,496,186
2-AMINOMETHYL BENZOFURAN DERIVATIVES
Marcel Descamps, Crainhem, and Henri Inion, Wemmel, Brabant, Belgium, assignors, by mesne assignments, to Laboratoires Labaz, Paris, France
No Drawing. Filed Oct. 10, 1967, Ser. No. 674,126
Claims priority, application Great Britain, Oct. 10, 1966, 45,269/66
Int. Cl. C07d *5/32, 99/04;* A61k *27/00*
U.S. Cl. 260—295                                            4 Claims

ABSTRACT OF THE DISCLOSURE 2-aminomethyl benzofuran derivatives having the formula:

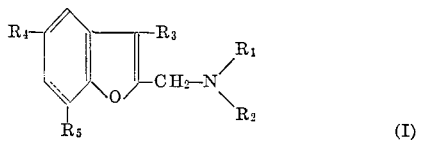

wherein $R_1$ represents 2-pyridyl, 3-pyridyl, 4-pyridyl, 3-methoxy-phenyl, 4-methoxy-phenyl, 3-chloro-phenyl, 4-chloro-phenyl, 3-methyl-phenyl or 4-methyl-phenyl; $R_2$ represents an ethyl, propyl or isopropyl chain bearing a dimethylamino, diethylamino, piperidino, N-methyl-piperazino, N-($\beta$-dimethylaminoethyl)-piperazino or N-($\gamma$-N-dimethylaminopropyl)-piperazino group; $R_3$ represents hydrogen or methyl; $R_4$ represents hydrogen, chlorine or N-piperidinomethyl; and $R_5$ represents hydrogen or, when $R_3$ represents hydrogen and $R_4$ represents hydrogen or N-piperidinomethyl, $R_5$ represents hydrogen or a methoxy group; and acid addition salts thereof. The derivatives have pharmaceutical properties whereby they are effective as cough remedies.

The derivatives are produced either by reacting an alkali-metal salt of a compound of the formula:

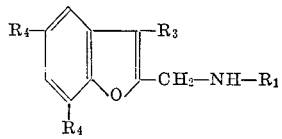

wherein $R_1$, $R_3$, $R_4$ and $R_5$ have the meanings given hereinabove, with a substituted halogeno-alkane of the formula $$Y—R_2$$

wherein Y represents a chlorine or bromine atom and $R_2$ has the meanings given hereinbefore; or condensing a 2-chloro-methyl-benzofuran of the formula:

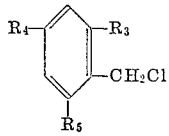

wherein $R_3$, $R_4$ and $R_5$ have the meanings given hereinbefore, with a secondary amine of the formula:

wherein $R_1$ and $R_2$ have the meanings given hereinbefore.

BRIEF SUMMARY OF THE INVENTION

This invention relates to novel substituted 2-aminomethyl-benzofurans, to methods of preparing the same and to their therapeutic use.

The benzofuran derivatives with which the invention is concerned are represented by the general formula:

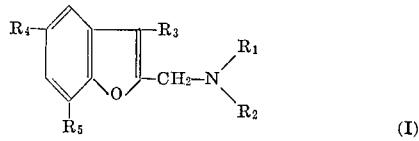

wherein $R_1$ represents 2-pyridyl, 3-pyridyl, 4-pyridyl, 3-methoxy-phenyl, 4-methoxy-phenyl, 3-chloro-phenyl, 4-chloro-phenyl, 3-methyl-phenyl or 4-methyl-phenyl; $R_2$ represents an ethyl, propyl or isopropyl chain bearing a dimethylamino, diethylamino, piperidino, N-methyl-piperazino, N-($\beta$-N-dimethylaminoethyl)-piperazino or N-($\gamma$-N-dimethylaminopropyl)-piperazino group; $R_3$ represents hydrogen or methyl; $R_4$ represents hydrogen, chlorine or N-piperidinomethyl; and $R_5$ represents hydrogen or, when $R_3$ represents hydrogen and $R_4$ represents hydrogen or N-piperidinomethyl, $R_5$ represents hydrogen or a methoxy group.

The pharmaceutically acceptable acid addition salts of the compounds of Formula I are included within the scope of the present invention.

The compounds of the invention have been found to possess valuable pharmaceutical properties in that they exert an antitussive effect rendering them useful as therapeutic substances. It has also been observed that the compounds of the invention possess, in adddition, an antihistaminic action devoid of any tendency to induce somnolence, which constitutes a valuable adjunct to the antitussive effect referred to above. It is, in fact, recognized that histamine plays an important part in the formation of the inflammation characteristic of cough. Furthermore, histamine has been found to produce spasm of the bronchial tubes. The fact that such antihistaminic activity is associated in the compounds of the invention with a specific antitussive effect renders the said compounds particularly effective for the treatment of cough.

The preferred compound of the invention is 2-[N-(2-pyridyl) - N - ($\beta$-N-dimethylaminoethyl)-aminomethyl]-benzofuran in the form of a pharmaceutically acceptable acid addition salt and preferably the fumarate.

One of the substances most commonly used in the preparation of cough sedatives is codeine. It is stated, for example, in The Pharmacological Basis of Therapeutics, 1965, edited by L. S. Goodman and A. Gilman, p. 265, that "the opiate remain among the most effective agents available for suppressing cough." However, it is desirable to avoid the use of opiates, such as codeine, in therapeutics, if suitable alternative medication can be employed. This principle is particularly significant in the case of cough, where it frequently happens that proper therapy is not applied until the symptom has become chronic. Since the treatment of cough thus involves prolonged medication in many cases, the employment of codeine necessarily entails the risk of undesirable and sometimes unforeseen side-effects. Independently of the constant danger of addiction and habituation, codeine has been found to exert a slowing-up effect upon intestinal transit resulting in chronic constipation. It may, furthermore, be added that, as stated on page 260 of the above-mentioned work, codeine, instead of being antihistaminic, releases histamine and, being a respiratory depresent, should be used with great care in asthmatic patients.

Pharmacological trials were carried out in order to compare the antitussive effect of codeine with that of the preferred compound of the invention, namely 2-[N-(2-pyridyl)-N-($\beta$ - N - dimethylaminoethyl)-aminomethyl]-benzofuran in the form of its fumarate salt.

The technique employed was as follows:

40 guinea-pigs were divided into four groups of 10 animals each. Groups A and B received respectively 100 mg./kg. and 200 mg./kg. of the preferred compound while Group C received 100 mg./kg. of codeine, all by intragastric route. Group D constituted the control group. One hour after administration, the animals were exposed, for 15 minutes, to an irritant aerosol. Results were measured by taking the average number of coughing fits occurring in each group during the 15 minutes of exposure to the irritant. Results were as follows:

| Group | Average Number of Coughing Fits | Reduction as Compared With Control Animals, Percent |
|---|---|---|
| A | 31.2 | 33 |
| B | 21.1 | 55 |
| C | 22.2 | 53 |
| D | 46.7 | |

When evaluating the effectiveness of the two compounds thus compared, attention should be given to the fact that the amount of codeine recommended for the treatment of affections such as cough is limited to about 200 mg. in a 100 ml. solution. This limitation does not apply to the preferred compound of the invention which can safely be used in much higher doses, such as, for example, 400 mg. in a 100 ml. solution. Thus, in practice, the results obtained with Group B may be compared with those observed in Group C. From this it follows that the preferred compound of the invention offers the possibility of providing a more effective antitussive than codeine without the well known inconveniences and dangers attendant upon the use of the latter.

The above pharmacological trials do not specifically take into account the histamine factor. This aspect was examined in other pharmacological trials in which the antihistaminic properties of the preferred compound of the invention were compared with those of the known antihistaminics promethazine and tripelennamine described in The Merck Index, seventh edition, pp. 857 and 1069 respectively.

This second series of trials was also carried out on groups of guinea-pigs of which some groups received the preferred compound of the invention while others were given either promethazine or tripelennamine, administration being by intravenous route.

At the same time, each animal received an intravenous dose of histamine equivalent to twise the lethal dose. The purpose of these trials was to establish the amount required of each substance to insure the survival of 50% of the animals in each group, i.e. the $ED_{50}$. The results obtained were as follows:

Preferred compound—$ED_{50}$=0.019 mg./kg.
Promethazine—$ED_{50}$=0.055 mg./kg.
Tripelennamine—$ED_{50}$=0.013 mg./kg.

which show that the preferred compound of the invention possesses a relatively powerful antihistaminic action. Similar trials revealed that codeine was inactive as an antihistaminic, even at an intravenous dose of 5 mg./kg.

It may be added that, contrary to codeine, the preferred compound of the invention does not induce somnolence in the doses required for the treatment of cough.

Finally, trials carried out on rats have shown that, unlike codeine, the preferred compound of the invention does not in any way influence the normal functioning of the bowels and is thus devoid of any constipating effect.

It will be appreciated that for therapeutic use the compounds of the invention will normally be administered in the form of a pharmaceutical composition comprising as an essential active ingredient a compound of Formula I in association with a pharmaceutical carrier therefor. The carrier may be a solid or liquid diluent or excipient of the kind normally employed in the production of medicaments ready for use, for example lactose, potato starch, talc, magnesium stearate, gelatin, sodium chloride or distilled water. Advantageously the composition may be made up in a dosage form appropriate to the desired mode of administration, which may be by the oral or parenteral route. Thus the dosage form may be, for example, a tablet, capsule or syrup for oral administration, or a sterile solution packaged in an ampoule for parenteral administration. When the dosage form is liquid, the concentration of active ingredient may be, for example, 100 mg. to 500 mg. per 100 ml.

The compounds of the invention may be prepared by employing the following methods.

For example, the compounds of Formula I may be prepared by reacting an alkali-metal salt, for example the sodium salt, of a compound of the general formula:

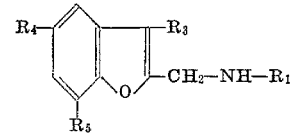

(II)

in which $R_1$, $R_3$, $R_4$ and $R_5$ have the same meanings as in Formula I, with a substituted halogeno-alkane of the general formula:

$$Y-R_2$$

in which Y represents a chlorine or bromine atom and $R_2$ has the same meaning as in Formula I.

The starting material corresponding to Formula II may be prepared by various methods.

For example, coumarilic acid, bearing in positions 3, 5 and 7 the substitutents $R_3$, $R_4$ and $R_5$ respectively, can be converted to its chloride by reaction with thionyl chloride. The coumarilic acid chloride so obtained is then converted by Rosenmund's reaction to the corresponding 2-formyl-benzofuran which is reacted with a primary amine of the formula $R_1NH_2$ in the presence of a reducing-agent such as lithium aluminium hydride, sodium or potassium borohydride, formic acid, or hyddrogen in the presence of Raney's nickel. This process leads directly to the required N-monosubstituted 2-benzofuryl - methylamine, without the necessity of separating the Schiff base formed momentarily as an intermediate product in the course of the reaction.

The starting coumarilic acids employed to obtain the compounds of Formula II in which $R_3$ is hydrogen and $R_4$ is chlorine or N-piperidinomethyl and in which $R_3$ is methyl and $R_4$ is hydrogen or chlorine, $R_5$ being in all cases hydrogen, are known compounds.

The starting coumarilic acids in which $R_3$ is hydrogen and $R_4$ is hydrogen or N-piperidinomethyl and $R_5$ is a methoxy radical are also known compounds.

The starting coumarilic acid employed to obtain the compound of Formula II in which $R_3$ is methyl and $R_4$ is of N-piperindomethyl can be prepared by condensing with piperidine the methyl 5-chloro-methyl-3-methyl-benzofuran-2-carboxylate described in British Patent No. 705,950 and hydrolyzing the condensation product to form the desired acid.

The starting material corresponding to Formula II can also be prepared by reacting the above-mentioned coumarilic acid chloride with a primary amine of the formula $R_1NH_2$ in an appropriate solvent, for example benzene, to form the corresponding monosubstituted amide which is then reduced by means of lithium aluminum hydride in a solvent such as tetrahydrofuran or diethyl ether to the required N-monosubstituted 2-benzofuryl-methylamine.

A further method of which the starting material corresponding to Formula II may be prepared comprises reacting a 2-chloromethyl-benzofuran of the general formula:

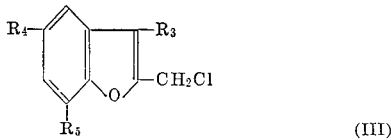

(III)

in which $R_3$, $R_4$ and $R_5$ have the same meanings as in Formula I with a primary amine of the formula $R_1NH_2$ in an appropriate solvent, for example toluene, and in the presence of a condensing agent such as sodamide.

Among the compounds represented by Formula III, that in which $R_3$, $R_4$ and $R_5$ are each hydrogen is a known compound. All the other compound represented by Formula III are prepared from the corresponding coumarilic acids already described. In all these cases, the starting substituted coumarilic acid is esterified by means of an alcohol and the resulting ester reduced, for example with lithium aluminum hydride, to give the corresponding alcoholic derivative which is then converted to the required substituted 2-chloro-methyl-benzofuran.

The compounds of the invention may also be prepared by condensing a 2-chloro-methyl-benzofurfan represented by Formula II with a secondary amine of the general formula:

(IV)

in which $R_1$ and $R_2$ have the same meanings as in Formula I.

The secondary amine of Formula IV can be prepared by reacting the primary amine $R_1NH_2$ with a compound of the formula $R_2X$ in which X is a halogen atom, preferably chlorine or bromine.

The compounds of Formula I may be converted into a corresponding pharmaceutically acceptable acid addition salt thereof by any of the known standard procedures, for example by dissolving the free base in a solvent, for example ether or isopropanol, and treating the resulting solution with the appropriate acid.

The following examples illustrate the invention.

Example 1.—Preparation of 2-[N-(2-pyridyl)-N-(β-N-dimethylaminoethyl)-aminoethyl]-benzofuran and its fumarate In a 5 litre flask equipped with stirrer, vertical condenser, thermometer and dropping-funnel, 224.25 g. of 2-[N-(2-pyridyl)-aminomethyl]-benzofuran were stirred in 2500 ml. of toluene until complete dissolution occurred. To this solution were added 113 g. of a 50% suspension of sodamide in toluene. While stirring, the reaction mixture was heated at 100° C. for 5 hours and then allowed to cool to about 50° C. after which a solution of 169.25 g. of β-N-dimethylaminoethyl chloride in 1000 ml. of toluene was added through the dropping-funnel. The solution was heated at 100° C. for 6 hours and then allowed to cool to room temperature. It was then washed several times with water, and the organic fraction was dried over anhydrous sodium sulphate, filtered and the toluene eliminated under reduced pressure. When the oily residue was distilled under vacuum, 240 g. of 2 - [N-(2 - pyridyl)-N-(β-N-dimethylaminoethyl)-aminomethyl]-benzofuran were obtained, boiling at 165–175° C. (0.01 mm. Hg). This base was dissolved in 1600 ml. of isopropanol and 93.9 g of fumaric acid were added. The solution was allowed to cool gradually to form crystals which were filtered out, washed with isopropanol over a filter and dried under vacuum at 50° C. In this manner, 251.1 g. of 2-[N-(2-pyridyl)-N-(β-N-dimethyl-aminoethyl)-aminomethyl]-benzofuran fumarate were obtained, melting at 125° C., which represented a yield of 75%.

Example 2.—Preparation of 2-[N-(2-pyridyl)-N-(β-N-dimethylaminoethyl) - aminomethyl] - benzofuran and its fumarate In a 5 litre flask equipped with stirrer, vertical condenser, thermometer and dropping-funnel, a suspension of 42.9 g. of sodamide in 2000 ml. of toluene was prepared while stirring and 165.2 g. of N-(β-N-dimethylaminoethyl)-N-(2 - pyridyl) - amine added. The mixture was allowed to simmer for 3 hours and was then cooled to about 40° C. after which 183.4 g. of 2-chloromethyl-benzofuran in 150 ml. of toluene were added. The reaction medium was maintained at the same temperature for 2 hours while still being stirred and was than heated to boiling point for 6 hours. After cooling to room temperature, the reaction product was washed several times with water, the organic fraction dried over anhydrous sodium sulphate, filtered, and the toluene eliminated under reduced pressure. By distilling the oily residue under vacuum, 165.5 g. of 2-[N-(2-pyridyl)-N-(β-dimethylaminoethyl-aminomethyl]-benzofuran, boiling at 165°–175° C. (0.01 mm. Hg) were obtained. This base was dissolved in 900 ml. of isopropanol and 65 g. of fumaric acid were added. The solution was allowed to cool gradually to form crystals which were filtered out, washed with isopropanol over a filter and dried under vacuum at 50° C. In this manner, 197 g. of 2-[N-(2-pyridyl)-N-(β-N-dimethylamino-ethyl)-aminomethyl]-benzofuran fumarate were obtained, melting at 125° C., which represented a yield of 43.5%.

In accordance with the processes described in general terms above and illustrated by Examples 1 and 2, the following derivatives were prepared by reacting the appropriate compound of Formula II with the required substituted halogeno-alkane of formula Y—$R_2$ or by reacting the appropriate compound of Formula III with the required secondary amine of Formula IV:

| Compounds | Melting Point, ° C. |
| --- | --- |
| 3-methyl-2-[N-(2-pyridyl)-N-(β-N-dimethylaminoethyl)-aminomethyl]-benzofuran. | 175 (oxalate). |
| 5-chloro-2-[N-(2-pyridyl)-N-(β-N-dimethylaminoethyl)-aminomethyl]-benzofuran. | 158 (oxalate). |
| 7-methoxy-2-[N-(2-pyridyl)-N-(β-N-dimethylaminoethyl)-aminomethyl]-benzofuran. | 186 (dioxalate). |
| 5-(N-piperidinomethyl)-2-[N-(2-pyridyl)-N-(β-N-dimethyl-aminoethyl)-aminomethyl]-benzofuran. | 190 (trioxalate). |
| 2-[N-(2-pyridyl)-N-(β-N-diethylaminoethyl)-aminomethyl]-benzofuran. | 130 (oxalate). |
| 2-[N-(2-pyridyl)-N-(γ-N-dimethylaminopropyl)-aminomethyl]-benzofuran. | 143 (dioxalate). |
| 2-[N-(2-pyridyl)-N-(β-N-dimethylaminopropyl)-aminomethyl]-benzofuran. | 140 (oxalate). |
| 2-[N-(2-pyridyl)-N-(β-N-piperidinoethyl)-aminomethyl]-benzofuran. | 180 (oxalate). |
| 5-chloro-2-[N-(2-pyridyl)-N-(β-N-piperidinoethyl)-aminomethyl]-benzofuran. | 167 (oxalate). |
| 2-[N-(2-pyridyl)-N-(γ-N-piperidinopropyl)-aminomethyl]-benzofuran. | 178 (oxalate). |
| 2-[N-(2-pyridyl)-N-(N-methyl-γ-N'-piperazinopropyl)-aminomethyl]-benzofuran. | 225 (2.5 oxalate). |
| 2-[N-(2-pyridyl)-N-(β-N-dimethylaminoethyl-β-N'-piperazinoethyl)-aminomethyl]-benzofuran. | 224 (trifumarate). |
| 2-[N-(2-pyridyl)-N-(γ-N-dimethylaminopropyl-β-N'-piperazinoethyl)-aminomethyl]-benzofuran. | 214 (trifumarate). |
| 2-[N-(2-pyridyl)-N-(γ-N-dimethylaminopropyl-β-N'-piperazinopropyl)-aminomethyl]-benzofuran. | 214 (tetraoxalate). |
| 2-[N-(2-pyridyl)-N-(β-N-dimethylaminoethyl-β-N'-piperazinopropyl)-aminomethyl]-benzofuran. | 200 (decomposition) (trifumarate). |
| 7-methoxy-2-[N-(2-pyridyl)-N-(β-N-dimethylaminoethyl-β-N'-piperazinoethyl)-aminomethyl]-benzofuran. | 211 (trifumarate). |
| 2-[N-(2-pyridyl)-N-(γ-N-dimethylaminopropyl-γ-N'-piperazinopropyl)-aminomethyl]-benzofuran. | 206 (trifumarate). |
| 2-[N-(2-pyridyl)-N-(β-N-dimethylaminoethyl-γ-N'-piperazinopropyl)-aminomethyl]-benzofuran. | 218 (trifumarate). |
| 2-[N-(3-pyridyl)-N-(β-N-dimethylaminoethyl)-aminomethyl]-benzofuran. | 190 (dioxalate). |
| 7-methoxy-2-[N-(3-pyridyl)-N-(β-N-dimethylaminoethyl)-aminomethyl]-benzofuran. | 120 (dioxalate). |
| 2-[N-(3-pyridyl)-N-(γ-N-dimethylaminopropyl)-aminomethyl]-benzofuran. | 178 (dioxalate). |
| 7-methoxy-2-[N-(3-pyridyl)-N-(γ-N-dimethylaminopropyl)-aminomethyl]-benzofuran. | 156 (dioxalate). |
| 2-[N-(3-pyridyl)-N-(β-N-dimethylaminopropyl)-aminomethyl]-benzofuran. | 125 (dioxalate). |
| 2-[N-(3-pyridyl)-N-(N-methyl-γ-N'-piperazinopropyl)-aminomethyl]-benzofuran. | 204 (trioxalate). |
| 7-methoxy-2-[N-(3-pyridyl)-N-(N-methyl-γ-N'-piperazinopropyl)-aminomethyl]-benzofuran. | 186 (trioxalate). |
| 2-[N-(3-pyridyl)-N-(β-N-dimethylaminoethyl-β-N'-piperazinoethyl)-aminomethyl]-benzofuran. | 200 (trifumarate). |

| Compounds | Melting Point, °C. |
|---|---|
| 2-[N-(3-pyridyl)-N-(γ-N-dimethylaminopropyl-β-N'-piperazinoethyl)-aminomethyl]-benzofuran. | 177 (trifumarate). |
| 2-[N-(3-pyridyl)-N-(β-N-dimethylaminoethyl))-β-N'-piperazinopropyl)-aminomethyl]-benzofuran. | 190 (decomposition) (trifumarate). |
| 2-[N-(4-pyridyl)-N-(β-N-dimethylaminoethyl)-aminomethyl]-benzofuran. | 169 (oxalate). |
| 7-methoxy-2-[N-(4-pyridyl)-N-(β-N-dimethylaminoethyl)-aminomethyl]-benzofuran. | 156 (dioxalate). |
| 2-[N-(4-pyridyl)-N-(β-N-piperidinoethyl)-aminomethyl]-benzofuran. | 175 (dioxalate). |
| 2-[N-(4-pyridyl)-N-(γ-N-dimethylaminopropyl)-aminomethyl]-benzofuran. | 196 (dioxalate). |
| 2-[N-(4-methyl-phenyl)-N-(β-N-dimethylaminoethyl)-aminomethyl]-benzofuran. | 159 (oxalate). |
| 2-[N-(4-methyl-phenyl)-N-(γ-N-dimethylaminopropyl)-aminomethyl]-benzofuran. | 154 (oxalate). |
| 2-[N-(3-methyl-phenyl)-N-(γ-N-dimethylaminopropyl)-aminomethyl]-benzofuran. | 145 (oxalate). |
| 2-[N-(3-methoxy-phenyl)-N-(β-N-dimethylaminoethyl)-aminomethyl]-benzofuran. | 150 (oxalate). |
| 2-[N-(3-methoxy-phenyl)-N-(β-N-piperidinoethyl)-aminomethyl]-benzofuran. | 176 (oxalate). |
| 2-[N-(3-methoxy-phenyl)-N-(γ-N-dimethylaminopropyl)-aminomethyl]-benzofuran. | 147 (oxalate). |
| 2-[N-(3-methoxy-phenyl)-N-(N-methyl-γ-N'-piperazinopropyl)-aminomethyl]-benzofuran. | 235 (dioxalate). |
| 2-[N-(4-methoxy-phenyl)-N-(β-N-dimethylaminoethyl)-aminomethyl]-benzofuran. | 142 (oxalate). |
| 2-[N-(3-chloro-phenyl)-N-(β-N-piperidinoethyl)-aminomethyl]-benzofuran. | 210 (oxalate). |
| 2-[N-(3-chloro-phenyl)-N-(γ-N-dimethylaminopropyl)-aminomethyl]-benzofuran. | 142 (oxalate). |
| 2-[N-(3-chloro-phenyl)-N-(N-methyl-γ-N'-piperazinopropyl)-aminomethyl]-benzofuran. | 230-31 (dioxalate). |
| 2-[N-(4-chloro-phenyl)-N-(β-N-dimethylaminoethyl)-aminomethyl]-benzofuran. | 152 (oxalate). |
| 2-[N-(4-chloro-phenyl)-N-(β-N-piperidinoethyl)-aminomethyl]-benzofuran. | 212 (oxalate). |
| 2-[N-(4-chloro-phenyl)-N-(γ-N-dimethylaminopropyl)-aminomethyl]-benzofuran. | 170 (oxalate). |

Example 3

An experimental syrup containing the following ingredients was made up in accordance with known pharmaceutical techniques:

| | |
|---|---|
| 2 - [N - (2-pyridyl)-N-(β-dimethylaminoethyl)-aminomethyl]-benzofuran fumarate | mg 400 |
| Citric acid | mg 450 |
| Sodium citrate | mg 550 |
| Sodium cyclamate | mg 200 |
| Soluble saccharin | mg 100 |
| Sorbitol | mg 7 |
| Methyl p-hydroxybenzoate | mg 120 |
| Propyl p-hydroxybenzoate | mg 20 |
| Tartrazine | mg 2 |
| Fruit flavouring | ml 0.5 |
| Ethyl alcohol | ml 5 |
| Distilled water | ml 15 |
| Simple syrup, containing 65% sugar, q.s. to make 100 ml. | |

In a preliminary series of clinical trials, fifty patients presenting cough of various origins were treated with the above experimental syrup. Each patient received enough syrup to insure a total daily intake of 60 mg. of active substance. This quantity was administered in three separate doses each containing 20 mg. of active substance. Duration of treatment, which varied from one case to another, ranged from 5 to 15 days. Good results were obtained in 72% of the cases treated and satisfactory results in 16%. The remaining six patients showed little response.

What is claimed is:

1. A compound of the formula:

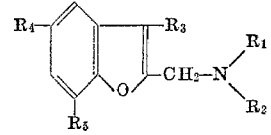

wherein $R_1$ represents 2-pyridyl, 3-pyridyl, 4-pyridyl, 3-methoxyphenyl, 4-methoxy-phenyl, 3-chloro-phenyl, 4-chloro-phenyl, 3-methyl-phenyl or 4-methyl-phenyl; $R_2$ represents an ethyl, propyl or isopropyl chain bearing a dimethylamino, diethylamino, piperidino, N-methyl-piperazino, N-(β-N-dimethylaminoethyl)-piperazino or N-(γ-N-dimethylaminopropyl)-piperazino group; $R_3$ represents hydrogen or methyl; $R_4$ represents hydrogen, chlorine or N-piperidinomethyl; and $R_5$ represents hydrogen or, when $R_3$ represents hydrogen and $R_4$ represents hydrogen or N-piperidino-methyl, $R_5$ represents hydrogen or a methoxy group; and the pharmaceutically acceptable acid addition salts thereof.

2. A compound as claimed in claim 1 which is 2-[N-2-pyridyl) - N - (β - N-dimethylaminoethyl)-aminomethyl]-benzofuran.

3. A compound as claimed in claim 1 which is a pharmaceutically acceptable acid addition salt of 2-[N-(2-pyridyl) - N - (β-N - dimethyl - aminoethyl) - aminomethyl]-benzofuran.

4. A compound as claimed in claim 1 which is 2-[N-(2-pyridyl) - N - (β-N - dimethylaminoethyl)-aminomethyl]-benzofuran fumarate.

References Cited

UNITED STATES PATENTS 2,489,777  8/1946  Horelois _____ 260—296
2,406,594  12/1943  Djerassi et al. _____ 260—296

OTHER REFERENCES

Aroyan et al., Chem-Abstracts, vol. 61, par. 8252-3, (1964.)

HENRY R. JILES, Primary Examiner

A. L. ROTMAN, Assistant Examiner

U.S. Cl. X.R.

260—268, 294, 294.7, 295, 295.5, 296, 346.2; 424—250, 263, 266, 267, 285